GOODELL & STEVENS.
Grist Mill.
No. 974. Patented Oct. 10, 1838.
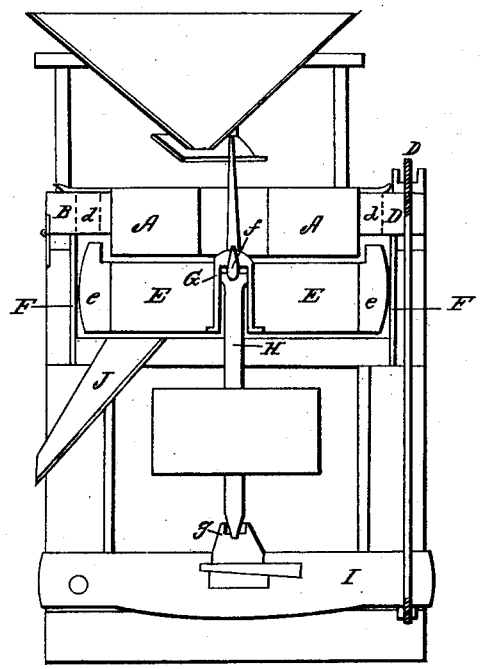
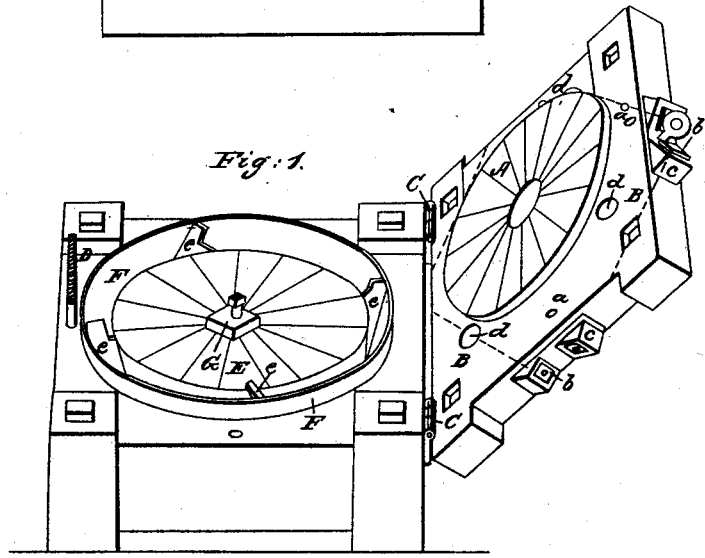

UNITED STATES PATENT OFFICE.

OLIVER P. STEVENS, OF PORT LAWRENCE, OHIO, FOR HIMSELF AND AS ASSIGNEE OF EZRA GOODELL.

IMPROVEMENT IN GRIST-MILLS.

Specification forming part of Letters Patent No. 974, dated October 10, 1838.

*To all whom it may concern:*

Be it known that we, EZRA GOODELL and OLIVER P. STEVENS, of the town of Port Lawrence, in the county of Lucas and State of Ohio, have invented certain new and useful Improvements in the Portable or Stationary Mill for Grinding Grain of Various Kinds; and we do hereby declare that the following is a full and exact description thereof.

In the mill as improved by us the lower stone is the runner, the upper stone being stationary, as in many other portable or stationary mills; but we have improved the manner of hanging the runner, and also of constructing certain other parts, so that the power and velocity may be advantageously increased, and the quantity of grain ground in a given time thereby augmented. The frame or husk we usually make square, securing it firmly together by mortises and tenons and by screw-bolts, so as to render it perfectly firm. The upper stone we fix in an independent frame, which is secured onto the lower or main frame containing the runner by stout hinges and by suitable screw-bolts.

Figure 1 in the accompanying drawings presents a perspective view of the top of the machine, with the frame containing the upper stone raised. A is the upper stone, inclosed in the frame B B, united to the lower or main frame by hinges at C C. The frame of the top stone, when in place, is secured there by bolts and nuts passing through the holes $a\ a\ a$ in it and in the main frame. D is the hoisting-rod, passing down to the bridge-tree and raising and regulating the runner in the usual manner. To secure the upper stone in its frame, we pass four bolts diagonally through the four pieces of which it consists. The heads and nuts of these bolts are seen at $b\ b\ b$, bearing against iron supports $c\ c$ let into the edges of the frame and so formed as to serve to sustain them. The dotted lines show the direction of the bolts. Holes $d\ d$ are made through the frame inclosing the upper stone, to admit a current of air to pass through to cool the meal. The current of air through these openings is regulated by sliding covers, by which they may be closed in any degree.

E is the lower stone, or runner, which is hung upon the spindle in a manner to be presently described. This stone is surrounded by a hoop, F, and there are wings $e\ e$ affixed to the edges of the runner in an oblique direction, for the purpose of creating a current of air, of preventing the adhering of the meal to the hoop, and of carrying it round to pass out at the spout. G is the head of a cast-iron box by means of which the stone is hung upon the spindle.

Fig. 2 is a vertical section through the center of the stones and frame. A A is the upper stone inclosed in its frame B B. The cast-iron box by means of which the lower stone, E, is hung, is shown at G. This box is made square, as is also the upper end of the spindle H, which fits into it. The box G is let into the lower stone and cemented truly and firmly in its place. It has a projecting rim or flange on its lower edge, which bears against the stone. The box is usually made somewhat smaller at its upper than it is at its lower end on the outside. The upper end of the spindle is made of steel, and is made a little larger than the portion immediately below it, so as to afford sufficient play to the hanging stone. It is balanced by means of a steel screw, $f$, which passes through the center of the box G, its point entering a cavity in the upper end of the spindle prepared to receive it. I is the bridge-tree, constructed and operating in the usual manner; J, the spout through which the meal passes from the stone. The spindle is oiled by means of a tube, $g$, through which it passes for that purpose.

What we claim as our invention, and wish to secure by Letters Patent, is—

1. The manner of securing the upper stone in an independent frame by the use of the diagonal bolts, applied as set forth, by which the frame can be screwed up and the stone firmly embraced whenever it may be necessary.

2. The hanging of the independent frame of the upper stone with hinges, allowing it to be turned back at pleasure when the bolts are removed by which it is secured to the lower frame.

3. The arrangement for hanging the lower stone, and regulating it by means of the square iron box, the square-headed spindle, and the regulating-screw, in their combined capacity, the upper end of the spindle, in this case, operating as a bail and driver in turning the stone.

We have not thought it necessary to designate any particular size for the stones or for the other parts, as these will be varied according to circumstances.

EZRA GOODELL.  [L. S.]
  OLIVER P. STEVENS.  [L. S.]

Witnesses:
 ALEXANDER OLIVER,
 JAMES M. WHITNEY.